Nov. 7, 1944.    W. A. ENDTER    2,362,256

LATCHING MECHANISM

Filed March 17, 1944    3 Sheets-Sheet 1

WALDEMAR A. ENDTER,
INVENTOR.

BY H. Calvin White
ATTORNEY.

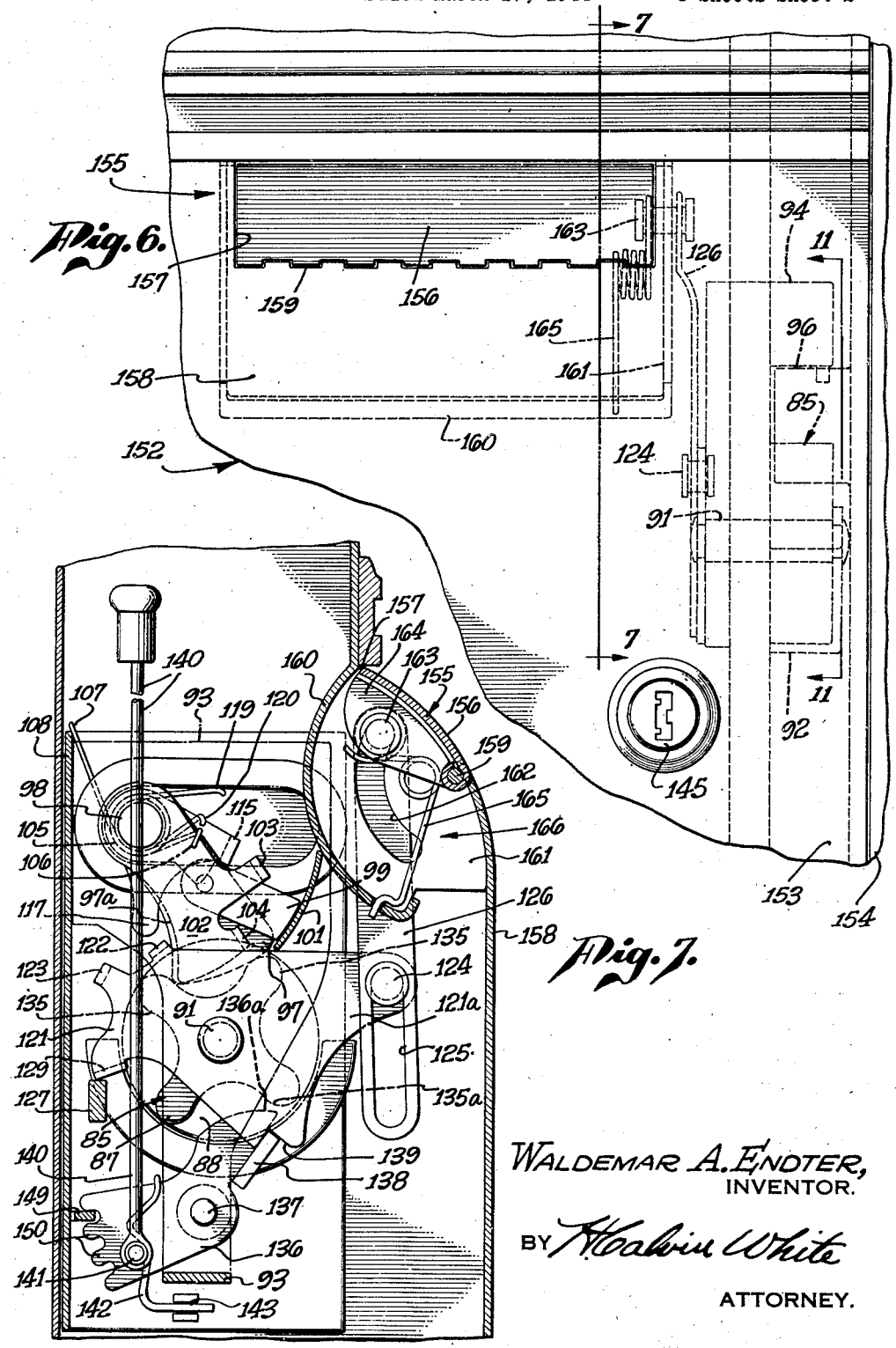

Nov. 7, 1944.   W. A. ENDTER   2,362,256
LATCHING MECHANISM
Filed March 17, 1944   3 Sheets-Sheet 3

WALDEMAR A. ENDTER,
INVENTOR.
BY H. Calvin White
ATTORNEY.

Patented Nov. 7, 1944

2,362,256

UNITED STATES PATENT OFFICE 2,362,256

LATCHING MECHANISM

Waldemar A. Endter, Long Beach, Calif.

Application March 17, 1944, Serial No. 526,914

24 Claims. (Cl. 292—214)

This invention has for its general purpose to simplify the construction and operation of latch mechanisms of the type in which a bolt element is urged in engagement with a keeper by bolt advancing means such as a cam, and such means is releasable from holding relation to the bolt by a manually controlled retracting device. More particularly, the invention aims to simplify the structure and arrangement of the retracting device in the latch assembly, and to provide an improved bolt advancing cam mechanism characterized by its capacity for self-locking against accidental retraction or retrograde movement.

While the invention is applicable to latch mechanisms of various specific kinds and forms, it is particularly adaptable to rotary bolt latches or locks and accordingly will be described typically with reference thereto. It may be stated generally concerning rotary bolt latches of the type contemplated, that the bolt is urged in a latching direction by one or more spring-pressed cams retractible from holding relation to the bolt by a retracting device controllable as by the usual operators at the inside and outside of the door. Ordinarily the bolt and cam parts are carried by one flange or section of an angular case, and the releasing mechanism and operator connections are carried by a second flange or section of the case.

One of my major objects is to simplify in a manner adaptable to practical and low-cost manufacture, the arrangement of the bolt, cam means and cam retracting device within the case. In accordance with the invention, the retracting device comprises in its preferred form, a pivoted member mounted for rotation in a plane parallel to a plane of movement or rotation of the bolt, and desirably about the axis of bolt rotation, thus providing a simple and compact assemblage of the parts in the same section of the case. This same assemblage advantageously may include a safety catch device which also is retractible from its normal or projected position by the cam retracting member.

Another object of the invention is to provide an improved cam device which, as stated before is self-locking, and is made so by a simple combination of the cam proper, and a holding or locking dog. Acting in association with the cam and dog assembly, is a retracting means operable to release the dog from holding relation to the cam to then permit retraction of the cam. As will appear, the invention contemplates adapting the self-locking feature to either pivoted or reciprocally sliding types of cams.

The above-mentioned and various additional objects such as the provision of manually controlled locking means adapted for cooperation with the parts assembled as described, will be explained to better advantage in the detailed description to follow and by reference to the accompanying drawings, in which:

Fig. 6 is an outside view of an automobile door embodying a variational form of the invention;

Fig. 7 is a section on line 7—7 of Fig. 6, the deck portion of the latch mechanism appearing in dot-dash lines to expose the parts;

Figure 1:
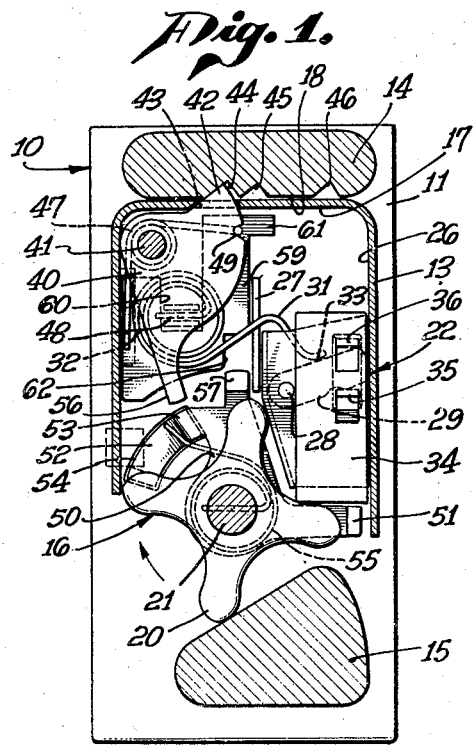
Fig. 1 is a sectional view illustrating one form of the invention with the safety catch engaged and the rotary bolt in latched association with its keeper.
Figure 2:
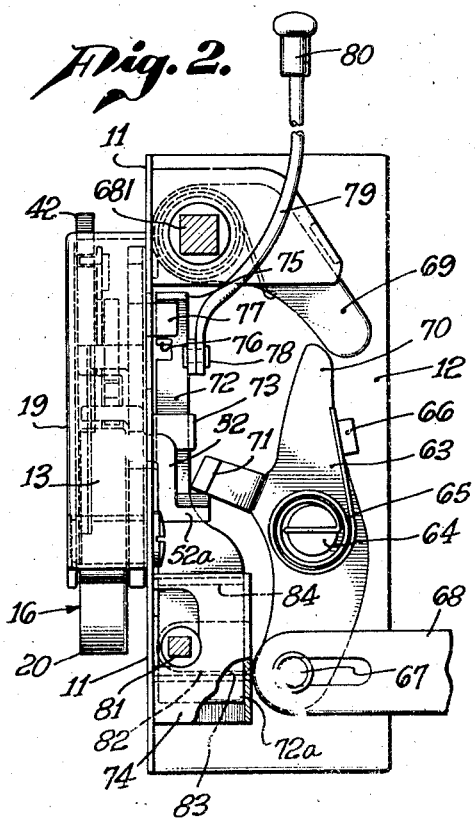
Fig. 2 is an elevation of Fig. 1 as viewed from the right, showing the control mechanism at the inside.

Referring first to Figs. 1 and 2, the latch mechanims comprises a case 10 having angular sections or flanges 11 and 12, the former carrying an outwardly projecting housing 13 containing the assembly of parts shown in Fig. 1. The housing 13 and its contained parts are movable between and in such relation to vertically spaced keeper parts consisting of lug 14 and the keeper 15, that in the latched position of the bolt 16, the top wall 17 of the housing 13 is brought directly below and may be caused to bear against the under surface 18 of the lug 14. The housing 13 is open at its lower end, and has an outer wall 19 which, together with the case flange 11, supports certain of the housing-contained parts as will appear.

Figures 4, 5:
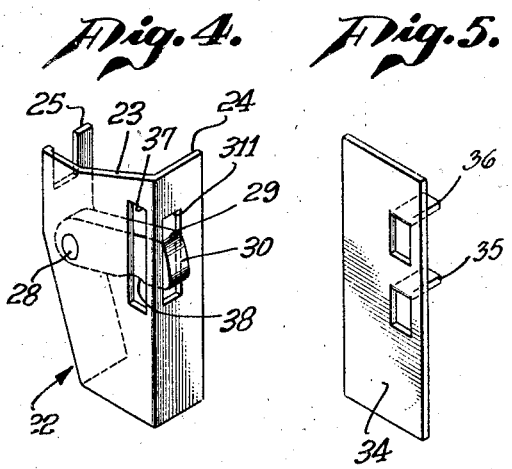
Fig. 4 is a perspective of the cam and holding dog assembly.
Fig. 5 is a perspective of the releasing plate.
Figure 3:
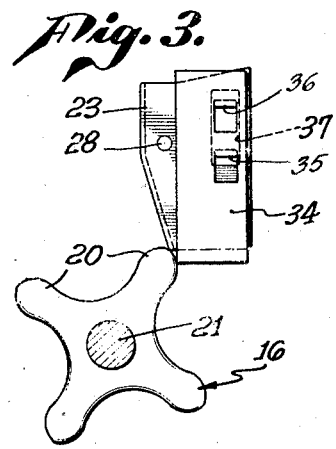
Fig. 3 is a view showing the relative positions of the bolt, cam and releasing plate at substantially the cam tripping positions.

The rotary bolt 16 preferably is of the type comprising a plurality of equi-angularly spaced heads 20 mounted on shaft 21 extending through the housing wall 19 and the case flange 11. The bolt is held against anti-latching rotation by a vertically movable cam and holding dog assembly, generally indicated at 22, the details of which are best illustrated in Figs. 4 and 5. The holding cam 23 has angular or turned portions 24 and 25 movable respectively along surface 26 of the housing and a guide 27 projecting outwardly from the case flange 11. Pivotally mounted on pin 28 within the cam 23 is a holding dog 29 having a rounded nose 30 projecting through slot 311 and engageable with the housing surface 26. The cam and holding dog assembly is urged against the bolt 16 by a coil spring 31 carried on a suitable support 32 and bearing at 33 against the top surface of the holding dog 29 at a point to the right of the pivot 28.

The dog 29 is movable out of holding relation to the housing surface 26, to permit retractive movement of the cam 23, by a plate 34 having a pair of projections 35 and 36 received within the cam slot 37 above and below the dog 29, the under surface of the dog being recessed at 38 to relieve any binding in the dog engagement by the projection 35. From Fig. 1 it will be observed that the releasing plate 34 projects below the lower end of the cam 23, and that projections 35 and 36 are capable of sufficient movement within the cam slot 37 to cause, by the engagement of projection 35 against the under surface of the dog, the latter to be swung slightly upward from tight or binding engagement with the housing surface 26, to release the cam 23 for upward movement relative to the bolt.

The latch mechanism may include a safety catch 40 pivotally carried on pin 41 at the outside of spring 31 and having a lug 42 projecting through slot 43 in the housing wall 17, into one of a series of notches 44, 45 and 46 in the under surface of the lug 14, in accordance with the position of the latch assembly relative to the keepers. This general type of safety catch and its various features and advantages are more particularly dealt with in my co-pending application, entitled Door latches, Ser. No. 511,940, filed November 27, 1943. The safety catch 40 is rotated to thrust lug 42 into the keeper recess, by a coil spring 47 bearing at 48 against the housing and at 49 against the safety catch element itself.

The cam, holding dog and plate assembly 22 is releasable for holding relation to the bolt 16 by a releasing plate 50 mounted on shaft 21 for rotation in a plane parallel to the plane of rotation of the bolt. The plate has an outwardly turned arm 51 engageable with the lower end of plate 34 to release the holding dog 29 and elevate the assembly 22, as will presently appear. A second arm portion 52 of the plate 50 is turned or bent inwardly at 53 through an arcuate slot 54 in the case flange 11, to bring the arm 52 at the inside thereof, as shown in Fig. 2. The plate 50 thus is capable of rotation about the shaft 21 with arm 52 swinging in a plane at the inside of the case flange. Counter-clockwise rotation of the releasing plate 50 from the position of Fig. 1 in which the turned portion 53 is stopped by engagement with the end of slot 54, is resisted by a coil spring 55 applied to the shaft 21 and bearing against the turned portion 53 of the arm.

Releasing plate 50 is adapted to be held in locked condition, i. e. against rotation to release either the bolt holding cam or safety catch, by a locking plate 59 confined at the inside of spring 31 for vertical sliding movement between guide 27 and the left side wall of the housing 13, the support at 32. Plate 59 has a projection 31 overlying the guide 27, and is notched to provide at 62 a shoulder adapted to be thrust into the path of the releasing plate lug 57, upon downward displacement of the plate 59, to lock the releasing plate 50 against counter-clockwise rotation.

Referring now to Fig. 2 and the control mechanism inside the case, operation of the releasing plate 50 is controlled by a lever 63 pivotally supported on the case flange 12 by pin 64. Counter-clockwise rotation of the lever 63 is resisted by a coil spring 65 applied to the shaft 64 and bearing against the lever at 66. The lever 63 is operable by its pin and slot connection at 67 with link 68 connected in the conventional manner with the usual inside door handle. The lever 63 also is operable from the outside door handle by rotation of its spindle 681 and resultant swinging of the spindle-carried arm 69 against the arm portion 70 of lever 63. Upon counter-clockwise swinging of lever 63 by operation of either the inside or outside door handles, the lever-carrier arm 71 engages the turned end 52a of the releasing plate arm 52, swinging the plate 50 in a counter-clockwise direction as viewed in Fig. 1.

Operation of the locking plate 59 is controlled by a reciprocally movable bar 72 confined intermediate its ends within guide 73 and at its lower ends 72a within a guide structure 74. The bar 72 carries a pair of spaced lugs 75 and 76 engageable with a lug 77 integral with and projecting from the locking plate 59 through an opening in the case flange 11. Thus upon downward movement of the bar 72 from the position of Fig. 2, the locking plate 59 is shifted down to a position bringing shoulder 62 into the path of a releasing plate lug 57, to lock the plate against its releasing or counterclockwise movement. Then upon elevation of the bar 72, lug 76 engages the lug 77 to return plate 59 to the position illustrated.

Bar 72 may be actuated by either or both an inside push-button connection or the usual outside key control. Thus the bar is shown to be connected at 78 with rod 79 leading to the push button 80 which may be manipulated to shift the bar, as described, to lock or release the parts. Similarly, a shaft 81, operatively associated with the usual key tumbler (not shown) may carry an arm 82 which when swung down or clockwise, engages shoulder 83 on the bar 72 to shift the latter downwardly and displace plate 59 into locking position, as explained. Upon reverse rotation of shaft 81, arm 82 engages shoulder 84 on the bar to shift the latter upward, causing lug 76 to engage and lift lug 77 to the locking plate releasing position.

Figure 8:
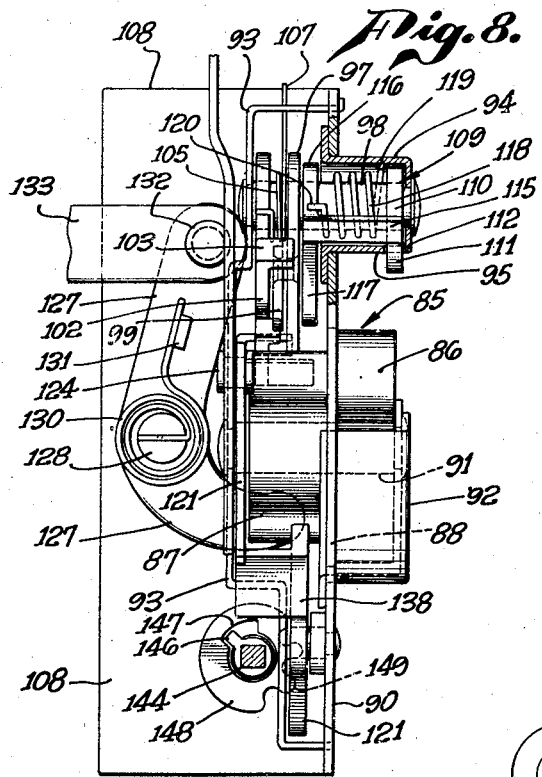
Fig. 8 is an inside view of the latch case and its contained parts, taken from the right in Fig. 7.
Figure 11:
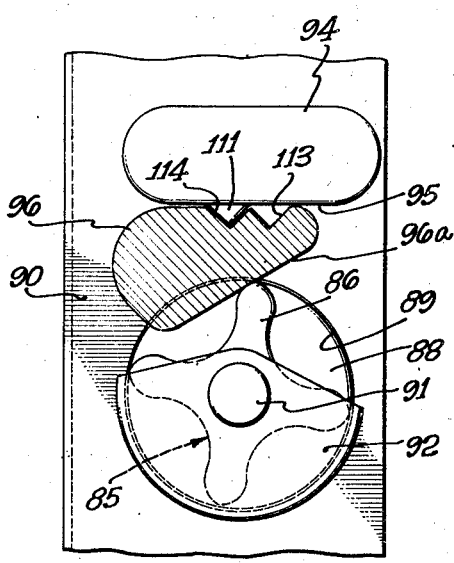
Fig. 11 is a fragmentary view of the keeper and bolt assembly taken as indicated by line 11—11 in Fig. 6.

In Figs. 6 to 11 I show a variational form of the invention differing from the previously described embodiment in such respects as the employment of a pivotally mounted cam, locking dog and releasing element assembly, and the association of the latch mechanism with a novel form of an outside handle or operator. Referring particularly to Figs. 7, 8 and 11, the bolt, generally indicated at 85, is of a usual form comprising inner and outer multi-headed sections 86 and 87 separated by a circular flange 88 contained within a circular opening 89 in the case section 90. The bolt is rotatable on a pin 91 supported by the usual outside bracket or semi-housing 92, and at the inside by a deck 93 affixed to the case and having the shape indicated by the dot-dash outline in Fig. 7. The case section hollow keeper projection or lug 94, the under surface 95 of which presents a bearing shoulder engageable by the pillar-supported keeper 96 when the latter is received between the bolt 85 and the lug 94, as shown in Fig. 11.

The bolt is urged in latching engagement with the keeper 96 by a cam 97 pivotally carried on a pin 98 terminally supported within the deck 93 and the outer portion of the keeper lug 94, as best illustrated in Fig. 8. A locking dog 99 pivotally carried on the cam 97 by pin 100, is engageable with a stationary curved surface 101 to hold the cam against retractive or retrograde movement, as will appear. Pin 98 also carries an oscillatory element 102 carrying a lug 103 projecting in overlying relation to the locking dog 99, and a second lug 104 adapted to be brought into engagement with the under surface of the dog 99 to release it from locking engagement with surface 101. Normally, the locking dog and cam 97 are urged in a bolt-advancing direction by a spring 105 placed about the pin 98 between the cam 97 and element 102, the ends of the spring bearing at 106 against the upper edge of the element and at 107 against the case flange 108. The spring pressure thus applied to the element 102 urges its lug 103 against the locking dog 99, bringing the latter into engagement with the curved surface 101. The thrust applied to the locking dog is communicated through pin 100 to the cam 97, causing the latter to bear against the inner section 87 of the bolt under the constant spring thrust.

As shown in Fig. 8, pin 98 carries within the keeper lug 94 a pivoted safety catch 109 comprising an outer portion 110 carrying a lug 111 projecting through opening 112 and receivable within either of notches 113 and 114 in the top surface of the keeper 96. When received within the keeper notch 113, lug 111 is in safety catch position, in advance of the tripping position of the cam. Upon advancement of the lug into notch 114, it occupies a further safety position substantially at or following tripping of the cam. Portion 110 of the safety catch is connected by member 115 with an inside piece 116 carrying a depending arm 117 engageable, as will appear, by releasing plate to disengage the safety catch from the keeper. The safety catch assembly 109 is urged in a direction tending to maintain the lug 111 in the path of the keeper 96, by a coil spring 118 bearing terminally at 119 against the inside of the keeper projection 94 and at 120 against the part 116.

The cam 97 and the safety catch are displaceable out of holding engagement respectively with the bolt and stationary keeper, by a releasing plate 121 pivotally mounted on the bolt pin 91 at the inside of the deck 93. The releasing plate 121 carries a lug 122 engageable with the element 102 to swing the latter counter-clockwise, and in advance of the cam 97, to bring lug 104 into releasing engagement with the dog 99. A second lug 123 carried by the releasing plate is engageable with arm 117 to retract the safety catch from the keeper notch 113 or 114.

Plate 121 is rotated clockwise in its cam and safety catch releasing operation, by either the inside or outside door handles or operators. An arm extension 121a of the plate carries a pin 124 received within slot 125 in a link 126 controlled at the outside of the door as will later appear. At the present it will suffice to observe that upon downward movement of the link 126 from the position of Fig. 7, plate 121 is rotated clockwise to release the cam and safety catch. Similar operation of the releasing plate is effected by lever 127 pivotally mounted on pin 128 carried by the case section 108 and engageable beneath the retracting plate lug 129, see Fig. 7. Coil spring 130 carried by the pin 128 and bearing against lug 131, normally maintains the lever 127 in its position of Fig. 8. Lever 127 is pivotally connected at 132 to an operator or link 133 connected to or controlled by the inside door handle in the usual manner. As will be apparent, the lost motion connection by pin 124 and slot 125 between the retracting plate and link 126, permits operation of the plate by lever 127 independently of the outside operator.

Figure 10:
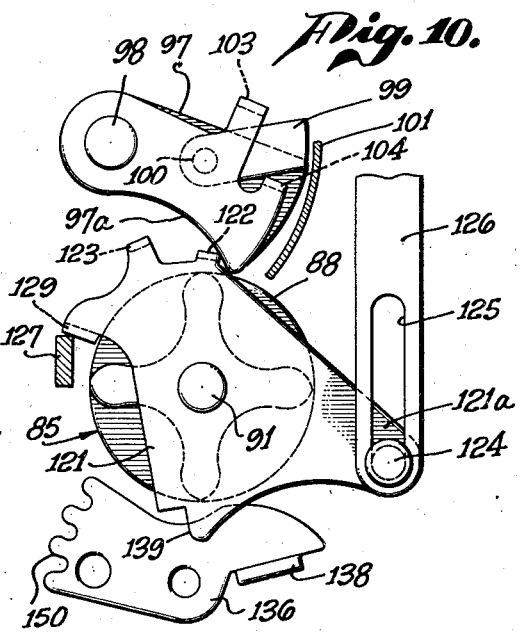
Fig. 10 is a further diagrammatic view illustrating the positions occupied by certain parts upon release of the cam locking dog.

In considering the operation of the mechanism described thus far, assume the parts to be in latched positions corresponding to Figs. 7 and 11 and that the bolt is to be disengaged from the keeper. Clockwise rotation of the retracting plate 121 by either the inside or outside operators first swings the element 102 a distance sufficient for lug 104 to swing dog 99 out of binding or holding engagement with the stationary surface 101. The cam 97 thereby becomes retractible, which movement is effected by the engagement of lug 122 with the forward edge 97a of the cam, so that element 102 and the cam are swung together in a retracting direction against the resistance of spring 105, permitting the bolt 85 to rotate out of the keeper. During such rotation of the plate 121, lug 123 engages arm 117 to release the safety catch 109. The final or released positions of the parts are illustrated in Fig. 10, wherein the plate 121 is assumed to have been actuated by the inside operated lever 127.

Upon release of the operator controlling the plate 121, spring 105, by virtue of the engagement of lug 103 with the locking dog 99, returns the element 102, cam and locking dog assembly to positions substantially as shown in Fig. 7, except that both bolt heads 135 are engaged by the cam, there being no resistance to bolt rotation.

Figure 9:
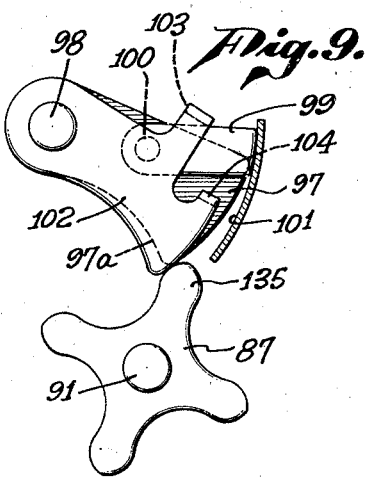
Fig. 9 is a diagrammatic view illustrating the position of the cam after tripping.

As the door is closed from open position, the bolt is rotated in a counter-clockwise direction by engagement with the keeper 96, and element 102, the cam and locking dog are displaced by the bolt engagement to the cam tripping position, i. e. the position at which element 102 will have moved past the nose of the bolt head 135, followed by the cam 97. Fig. 9 illustrates the positions assumed by the parts just beyond the cam tripping position. Thereafter the cam is thrust against the bolt to urge it against the inclined keeper surface 96a, and the dog 99 is pressed into engagement with surface 101 to securely lock the cam against anti-latching displacement as a result of any retractive bolt thrust.

Provision is made for locking plate 121 from either the inside or outside of the door, against retractive rotation. A locking lever 136 pivoted on pin 137 carries a lug 138 engageable in the locked position of the lever, shown in Fig. 7. with shoulder 139 on the plate 121 to block the latter against releasing rotation. Lever 136 is operable by the inside push button rod 140 pivotally connected at 141 to the lever, the locked and released positions of the push button rod being established by engagement of the pin at 141 with a detent spring 142, shaped as illustrated, and supported at 143 inside the case. Lever 136 also is operable by rotation of spindle 144, see Fig. 8, of the key controlled plug 145 in the outside of the door as shown in Fig. 6. Spindle 144 carries a lug 146 engageable with the end shoulders of a recess 147 in the usual gear segment 148. The gear teeth 149 intermesh with teeth 150 of the gear segment on the outer end of arm 136, to throw lug 138 into or out of the path of plate 121, as the case may be. In the event lever 136 is in its locked position when the door is open, the lever is displaceable out of the path of plate 121 by virtue of the bolt rotation upon its engagement with the end of the keeper 96. Thus upon resultant clockwise rotation of the bolt as viewed in Fig. 7, head 135a engages the lever surface 136a, camming the lever downward a distance sufficient for lug 138 to clear the shoulder 139.

Figs. 6 and 7 illustrate the position of the latch mechanism within an automobile door 152 having a flange portion 153 in overlapping relation with the stationary pillar 154 which carries the keeper 96. These views also illustrate the operative association of the latch mechanism with a novel form of outside operator or handle, generally indicated at 155, differing characteristically from the ordinary outside handle in that it is adapted to the door contour or shape to avoid any outwardly projecting part. Here the handle comprises a press plate 156 contained within opening 157 in the bulge of the outer door wall 158, to which the plate is hinged at 159 for downward swinging movement at the outside of a curved shell 160. The latter is connected to wall 158 by end members 161, the one of which appearing in Fig. 7 contains an arcuate slot 162 through which projects a pin 163 carried by the flange end 164 of the press plate 156. A spring 165 terminally engaging the pin 163 and wall 160, resists downward swinging of plate 156 about the hinge 159. Pin 163 pivotally carries the link 126 having the previously described connection with the releasing plate 121.

To open the door at the outside, plate 156 is pressed downwardly within the door cavity 166, causing link 126 to rotate plate 121 in the cam and safety catch releasing direction. Spring 165 returns the plate 156 to its normal illustrated position after pressure on the plate is released. When pressed downwardly within the cavity 166, the plate forms a convenient handle or grip for swinging the door. Wall 160, curving in close proximity to the edge of the press plate, serves as a finger guard and also as a means for preventing objects from becoming inserted in the cavity beneath the plate and therefore interferring with its operation.

I claim:

1. In a latch mechanism, a bolt movable in a plane to a position of latched engagement with a keeper, means urging said bolt in a latching direction, and a member pivotally movable relative to said urging means in a plane substantially parallel to said plane of movement of the bolt and operable to release said means from said urging relation to the bolt.

2. In a latch mechanism, a bolt movable in a plane to a position of latched engagement with a keeper, cam means for advancing said bolt in a latching direction, and a member pivotally movable relative to said cam means in a plane substantially parallel to said plane of movement of the bolt and operable to release said cam means from said advancing relation to the bolt.

3. In a latch mechanism, a bolt movable in a plane to a position of latched engagement with a keeper, a safety catch movable between advanced and retracted positions, means urging said bolt in a latching direction, and means pivotally movable in a plane substantially parallel to said plane of movement of the bolt and operable to release said means from said urging relation to the bolt and operable also to move said safety catch from advanced to retracted position.

4. In a latch mechanism, a bolt movable in a plane to a position of latched engagement with a keeper, cam means for advancing said bolt in a latching direction, a safety catch movable between advanced and retracted positions, and a member pivotally movable in a plane substantially parallel to said plane of movement of the bolt and operable to release said cam means from said advancing relation to the bolt and operable also to move said safety catch from advanced to retracted position.

5. In a latch mechanism, a bolt movable in a plane to a position of latched engagement with a keeper, a safety catch movable between advanced and retracted positions, means urging said bolt in a latching direction, and means movable in a plane substantially parallel to said plane of movement of the bolt and operable to release said means from said urging relation to the bolt and operable also to move said safety catch from advanced to retracted position.

6. In a latch mechanism, a bolt pivotally movable in a plane of rotation to a position of latched engagement with a keeper, means urging the bolt in a latching direction, and a member pivotally movable relative to said urging means in a plane substantially parallel to said plane of rotation of the bolt and operable to release said means from said urging relation to the bolt.

7. In a latch mechanism, a bolt pivotally movable in a plane of rotation to a position of latched engagement with a keeper, cam means urging the bolt in a latching direction, and a member pivotally movable relative to said cam means about the axis of rotation of the bolt in a plane substantially parallel to said plane of rotation of the bolt and operable to release said cam means from said urging relation to the bolt.

8. In a latch mechanism, a bolt pivotally movable in a plane of rotation to a position of latched engagement with a keeper, cam means urging the bolt in a latching direction, a safety catch pivotally movable in a plane substantially parallel to said plane between advanced and retracted positions, and a member pivotally movable in a plane substantially parallel to said plane of rotation of the bolt and operable to release said cam means from said urging relation to the bolt and operable also to move said safety catch from advanced to retracted position.

9. In a latch mechanism, a bolt pivotally movable in a plane of rotation to a position of latched engagement with a keeper, means urging the bolt in a latching direction, a safety catch movable between advanced and retracted positions, and a member pivotally movable in a plane substantially parallel with said plane of rotation of the bolt and operable to move said safety catch from advanced to retracted positions.

10. In a latch mechanism, a case having angularly disposed first and second sections, a rotary bolt carried by said first section and movable to a position of latched engagement with a keeper, means urging said bolt in a latching direction, a member carried by said first section and rotatable relative to said urging means about the axis of rotation of the bolt to release said means from said urging relation to the bolt, an arm carried by said member and projecting through an opening in said first section, and means carried by said second section and engageable with said arm to actuate said member.

11. In a latch mechanism, a case having angularly disposed first and second sections, a rotary bolt pivotally carried by said first section and rotatable to a position of latched engagement with a keeper, cam means urging said bolt in a latching direction, a member pivotally carried by said first section and rotatable relative to the cam means about the bolt axis to engage and release said cam means from said urging relation to the bolt, an arm carried by said member and projecting through an opening in said first section, means carried by said second section and engageable with said arm to rotate said member in a cam-releasing direction, and means resisting rotation of the member in said direction.

12. In a latch mechanism, a case having angularly disposed first and second sections, a bolt pivotally carried by said first section and rotatable to a position of latched engagement with a keeper, cam means urging said bolt in a latching direction, a safety catch pivotally carried by said first section and rotatable between advanced and retracted positions, a member pivotally carried by said first section and rotatable to release said cam means from said urging relation to the bolt and also to rotate said safety catch from advanced to retracted position, and means carried by said second section and operable to actuate said member in its rotative movement.

13. In a latch mechanism, a bolt movable into latched engagement with a keeper, a cam movable to urge the bolt against the keeper, and a locking dog coacting with the cam to hold the cam against retrograde movement in its bolt-urging travel.

14. In a latch mechanism, a bolt movable into latched engagement with a keeper, a cam movable to urge the bolt against the keeper and to hold the bolt against anti-latching movement, a locking dog coacting with the cam to hold the came against retrograde movement in its bolt-urging travel, and means for sequentially releasing said locking dog and cam from their said holding relations to the cam and bolt respectively.

15. In a latch mechanism, a bolt movable into latched engagement with a keeper, a cam movable to advance the bolt in a latching direction, a support, and a locking dog carried by the cam and engageable with said support to prevent retrograde movement of the cam in its bolt-advancing travel.

16. In a latch mechanism, a bolt movable into latched engagement with a keeper, a cam engageable with the bolt to advance the bolt in a latching direction, a support, a locking dog engageable with said support to prevent retrograde movement of the cam in its bolt-advancing travel, and means pivotally connecting said cam and locking dog at a location offset from a line through their points of contact with said bolt and support.

17. In a latch mechanism, a bolt movable into latched engagement with a keeper, a reciprocally slidable cam movable to urge the bolt against the keeper, a support, and a locking dog co-acting with the cam and engageable with said support to prevent retrograde movement of the cam in its bolt-urging travel.

18. In a latch mechanism, a bolt movable into latched engagement with a keeper, a pivotally mounted cam rotatable to urge the bolt in a latching direction, a support, and a locking dog co-acting with the cam and engageable with said support to prevent retrograde rotation of the cam in its bolt-urging travel.

19. In a latch mechanism, a bolt movable into latched engagement with a keeper, a cam movable to advance the bolt in a latching direction, a support, a locking dog pivotally connected to the cam and engageable with said support to prevent retrograde movement of the cam in its bolt-advancing travel, and a spring acting against said dog to urge the cam in a bolt-advancing direction.

20. In a latch mechanism, a bolt movable into latched engagement with a keeper, a cam movable to advance the bolt in a latching direction and operable to hold the bolt against reverse movement, a support, a locking dog pivotally connected to the cam and engageable with said support to hold the cam against retrograde movement, and means for sequentially releasing said locking dog and cam from their said holding relations to the cam and bolt respectively.

21. In a latch mechanism, a bolt movable in a plane to a position of latched engagement with a keeper, a cam urging said bolt in a latching direction and holding the bolt against reverse movement, a locking dog coacting with the cam to hold the cam against retrograde movement, and a member pivotally movable in a plane substantially parallel to said plane of movement of the bolt and operable to release said cam and dog from their said holding relations to the bolt and cam respectively.

22. In a latch mechanism, a case having angularly disposed first and second sections, a bolt carried by said first section and movable to a position of latched engagement with a keeper, a cam urging said bolt in a latching direction and holding the bolt against reverse movement, a locking dog coacting with the cam to hold the cam against retrograde movement, a retracting member carried by said first section and operable to release said cam and dog from their said holding relations to the bolt and cam respectively, and means carried by said second section of the case and operable to actuate said retracting member.

23. In a latch mechanism, a case having angularly disposed first and second sections, a bolt pivotally carried by said first section and rotatable to a position of latched engagement with a keeper, a cam urging said bolt in a latching direction and holding the bolt against reverse movement, a locking dog coacting with the cam to hold the cam against retrograde movement, a retracting member pivotally carried by said first section and rotatable to release said cam and dog from their said holding relations to the bolt and cam respectively, and means carried by said second section of the case and operable to rotate said retracting member.

24. In a latch mechanism, a bolt movable in a plane to a position of latched engagement with a keeper, means urging said bolt in a latching direction, a member pivotally movable relative to said urging means in a plane substantially parallel to said plane of movement of the bolt and operable to release said means from said urging relation to the bolt, and manually controlled means for locking said member against such releasing operation.

WALDEMAR A. ENDTER.